United States Patent
Waud

[15] 3,682,507
[45] Aug. 8, 1972

[54] THREADED FASTENER WITH STABILIZING THREADS

[72] Inventor: Cornelius Byron Waud, Lake Forest, Ill.

[73] Assignee: Illinois Tool Works Inc. Chicago, Ill.

[22] Filed: June 2, 1970

[21] Appl. No.: 42,657

[52] U.S. Cl. ............................. 287/189.36 F, 85/41
[51] Int. Cl. .................................................. F16b 5/02
[58] Field of Search ....... 85/41, 46, 47; 287/189.36 F

[56] References Cited

UNITED STATES PATENTS

| | | | |
|---|---|---|---|
| 2,174,578 | 10/1939 | Graham | 85/46 |
| 3,478,639 | 11/1969 | Gruca | 85/41 |
| 2,382,019 | 8/1945 | Miller | 85/41 |

*Primary Examiner*—Edward C. Allen
*Attorney*—Robert W. Beart, Michael Kovac, Barry L. Clark and Jack R. Halvorsen

[57] ABSTRACT

This invention relates generally to screw-type fasteners of the type adapted for use with panels comprising insulation material bounded by sheet material on one side and a thicker purlin material on the other side. The fastener includes three sections of thread convolutions. The first section is located directly beneath the head of the fastener and extends for a short axial distance. The second section is located near the drilling point of the fastener and is adapted to fasten to the thick sheet of purlin material comprising part of the panel. The intermediate or third section is utilized to prevent the fastener from falling freely through the insulating material and thus prevents possible breaking of the drilling tip or cocking of the fastener out of the perpendicular plane.

3 Claims, 4 Drawing Figures

PATENTED AUG 8 1972
3,682,507
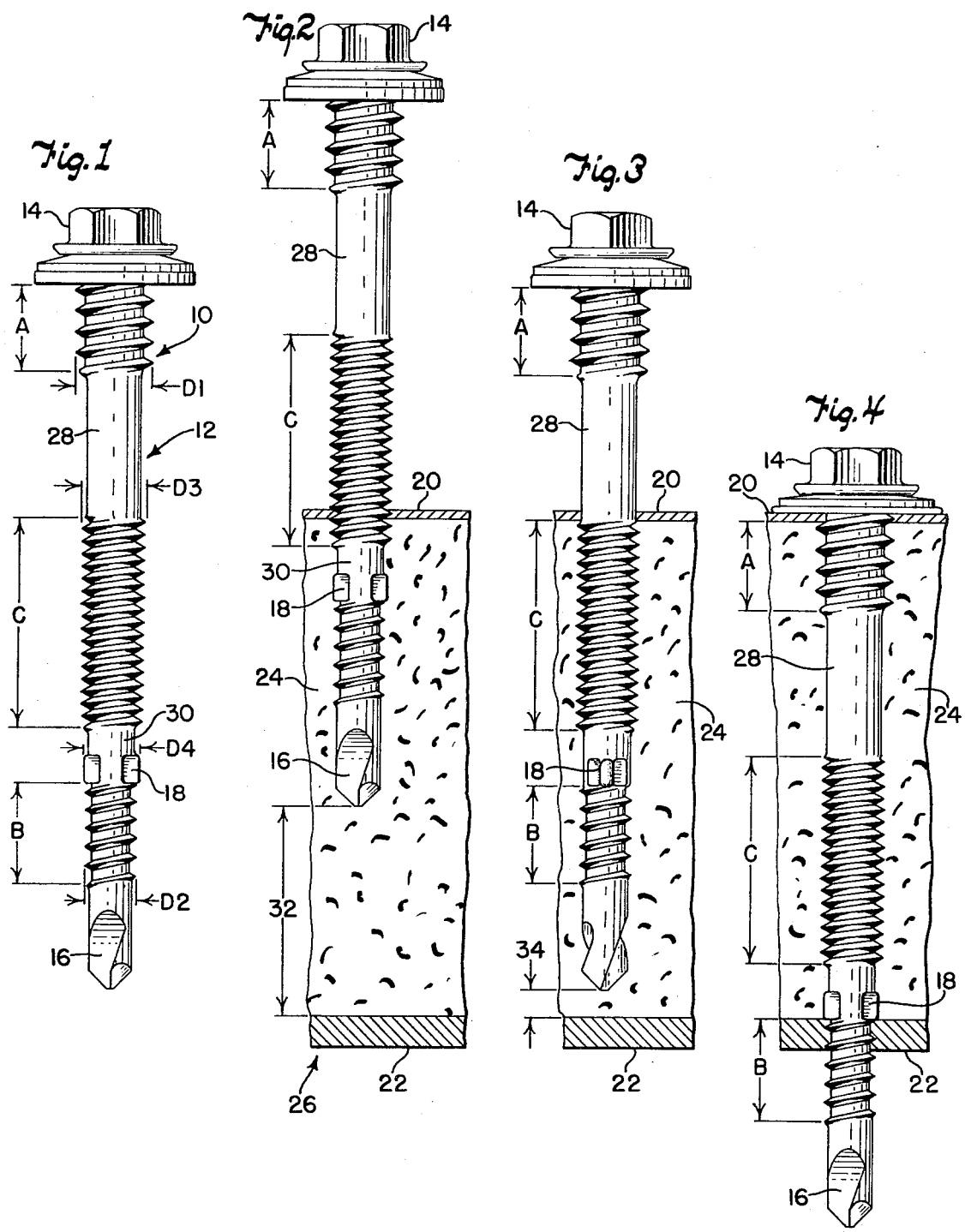
INVENTOR.
Cornelius Byron Waud
BY Michael Korac
Robert W. Beart
His Att'ys

THREADED FASTENER WITH STABILIZING THREADS

BACKGROUND OF THE INVENTION

1. Field of the Invention

This invention relates generally to screw-type fasteners of the type adapted to be utilized in a panel which includes a relatively large axial extent of insulating material between two or more sheets of material.

2. Description of the Prior Art

One of the problems incident to the use of rotary threaded fasteners with relatively soft panels such as foam insulation material, is that of free falling of the fastener through the soft material and the cocking of the fastener as it passes through a relatively large extent of foam material.

Other problems incident to the use of fasteners in insulating panels has been the compression or distortion of the insulation material. This latter problem has been solved by fasteners such as that disclosed in Gruca U.S. Pat. No. 3,478,639.

However, the use of the fastener disclosed in Gruca in a panel of a relatively thick extent of foam material will not prevent the threaded fastener from rapidly being forced through the foam material with the accompanying possibility of breaking the drilling point upon reaching the thick purlin.

SUMMARY OF THE INVENTION

It is an object of this invention to provide a fastener which may be forced through an insulating material in a non-free falling fashion thus insuring against breakage of the drilling point.

It is another object of this invention to provide a means on a fastener which will vertically stabilize the entrance of the fastener through a thin sheet of material and a relatively large axial extent of insulation material to facilitate entry of the fastener in predrilled holes.

It is a further object of this invention to provide an improvement to fasteners of the type capable of insuring against the crushing of a foam insulating material by the provision of a threaded portion on the shank of the fastener to enable the axial force and accompanying speed of entry through the insulating material to be controlled.

Other objects and advantages are produced by a threaded fastener having three sections of thread convolutions. The first section of threads extends for a limited axial extent beneath the head of the fastener, a second threaded portion is located adjacent the drilling point of the fastener and a third threaded section, intermediate the first and second sections, is axially separated from said first and second sections by unthreaded portions. The portion between the second and third sections includes radially extending abutment wings for limiting the penetration of the fastener.

The use of threaded fasteners in panels comprising a thin upper sheet and a relatively thick purlin separated by a large depth of soft insulating material, necessitates some means on the fastener to prevent it from being forced through the insulating material by a power driven tool with such a force that the drilling tip may break upon contacting the lower surface or purlin. This invention utilizes an intermediate threaded portion between a top threaded portion and a lower threaded section. The top section is intended to pull the thin top sheet upwardly against the head of the fastener, and the lower threaded section is intended to connect the fastener to the thick purlin section. In addition, the intermediate threaded portion is separated from the top threaded portion by an unthreaded portion of the shank. This unthreaded portion is situated in such a manner as to allow the drilling of the purlin to proceed without the limitations on axial movement produced by the intermediate stabilizing thread section. In addition, the unthreaded portion allows a limited amount of free fall which gives the operator a certain "feel" for the positioning of the fastener.

BRIEF DESCRIPTION OF THE DRAWINGS

FIG. 1 is a side elevational view of a screw fastener which is representative of one embodiment of the present invention;

FIG. 2 is a view of the fastener shown in FIG. 1 in a stage of operational association with an insulated panel showing the stabilizing threads in operation;

FIG. 3 is another view of the fastener shown in FIG. 1 showing completing the contact of the stabilizing threads with the top sheet; and FIG. 4 is a view of the fastener shown in FIG. 1 showing the axial extent of penetration into a panel limited by the winged lugs.

DESCRIPTION OF THE PREFERRED EMBODIMENT

Referring now to the drawings more in detail, wherein like numerals have been employed to designate similar parts throughout the various views, it will be noted that a screw type fastener of the type contemplated by the present invention is designated generally by the numeral 10 as shown in FIG. 1. Fastener 10 includes a shank 12 having a work clamping head 14 at one extremity thereof and an entering tip 16 which in the present embodiment is in the nature of a drill point. The shank 12 includes a first threaded section A extending for a limited axial extent from the vicinity of the clamping side of the head 14, a second threaded section B extending from the entering end 16 for a limited axial extent upwardly toward the clamping head 14, and a third threaded section C intermediate the sections A and B. An unthreaded section 28 extends axially beyond the threaded section A for a distance approximating the axial extent of the drilling end portion 16. Another unthreaded shank section 30, extending between sections B and C, includes oppositely disposed lug means or abutment wings 18.

The thread convolutions of the first threaded section A are of a higher pitch than the second threaded portion B, the purpose of which will be explained in the following discussion. The pitch of the threads in section C are shown to be of a lower pitch than either section A or B. However, it will be understood that the pitch of section C will vary in accordance with the rate of entry desired.

The outer diameter of the threaded section A is designated by D1, the outer diameter of the threaded section B is designated by D2, and the outer diameter of the third threaded section C is designated by D3. The diameter defined by the outer limits of the lugs or wing means is designated by D4. The diameter D1, of the first threaded section, is greater than the diameter D2 and greater than or equal to diameter D3. Diameter D1 is also greater than the outer diameter D4 of the lugs 18. Likewise, the outer diameter D3 of the third threaded section C is greater than that of the lugs and the second threaded section B. To insure proper abutment and stoppage of the threaded fastener upon reaching the desired penetration through the purlin 22, the diameter D4 of the lugs is greater than the root diameter of the threaded section B.

The successive decrease in diameter of the various sections along the axial extent of the shank, with the exception of the unthreaded portion 28, provides controlled contact of the fastener with the thin sheet 20 during its penetration therethrough.

As previously indicated, the present invention contemplates a screw-type fastener which is utilized in an insulation panel indicated generally by numeral 26. This panel structure includes a central or intermediate section 24. One side of the section 24 is bounded by a purlin or wall section 22, and the other side is covered by a relatively thin sheet 20, which in the present disclosure comprises a relatively thin metallic sheet. In 28 FIGS. 2–4, the use of the fastener which is the subject matter of this invention, is shown in various stages of operation in such a panel which includes a relatively large depth of soft insulating material 24 which may alternatively be a void. In FIG. 2, the drill point has pierced the top thin sheet material and the lugged portion has reamed the hole produced by the drilling end sections. The stabilizing threads C contact the thin sheet of material and prevent the threaded fastener from being rapidly forced through the insulating material in a free falling operation. Without such stabilizing threads, the fastener would proceed through the insulating material or void for the distance 32 which represents the free fall distance. An uncontrolled drop of the fastener, under pressure of a power tool, could possibly incur substantial damage to the drilling point 16 upon contacting the purlin 22.

In FIG. 3, the fastener has proceeded at a controlled rate through the insulating material by the interaction of the stabilizing threads of section C with the thin sheet of material 20. It is noted that there still exists a relatively small free fall distance, designated as distance 34. This distance will not provide a deleterious effect on the drill point, but will provide a certain amount of operator "feel" or indication of the imminence of the drilling operation. In the course of the passage through the thin sheet of material and the insulating material, the stabilizing threads will also aid in maintaining the fastener in a substantially vertical position. This positioning is particularly important when pre-drilled holes are used and the matching of the holes with the fastener is to be effected. When pre-drilled holes are used, it is understood that a drilling point is not necessary. FIG. 3 shows another view of the lugs 18 rotated to a position 90° from the other views.

In FIG. 4, the threaded fastener is shown in a finished position. The entering end 16 has drilled a hole in the purlin 22 and has threaded the fastener to the purlin with the use of the threaded section B. Due to the undesirability of overtorquing a fastener when used in an environment such as an insulating panel, the fastener is designed in such a manner as to provide automatic stopping means so that the fastener may not proceed through the purlin to such an extent as to crush the insulating material 24 and the thin sheet 20 or reduce the intended spacing between 20 and 22. The lugs or wings 18 thus serve the purpose of restricting any further axial movement of the fastener upon engagement of the purlin 22. As stated above, this is accomplished by the difference in diameters of the wings 18 and the outer diameter of the threaded portion B.

Prior to the engagement of the wing means with the purlin, the first threaded section A will have engaged the thin metal stock blank in such a manner as to deflect it outwardly toward the head section. This outward expansion of the thin sheet is the result of the varying pitches of sections A and B. Thus as the screw fastener reaches the limit of its penetration within the panel, the clamping side of the screw head 14 has exerted little or no clamping force against the insulating foam section. This is extremely important because any tendency to compress the foam material 24 reduces the desired cellular content of the insulating material, thereby materially impairing its insulating efficiency.

While the stabilizing threaded section C insures a controlled drop of the fastener through the insulating material, the interaction of this thread, or any threaded section, is not desired during the drilling of the purlin. Thus the fastener is designed to provide a very small free fall followed by a drilling operation which is not controlled by interference with the fastener and the top sheet 20. The unthreaded portion 28 is therefore the is of an axial extent equal to or slightly greater than the axial extent of the drilling tip to facilitate an unimpeded drilling operation.

Upon the completion of the drilling procedure, the thread portion B threads the purlin 22. During this threading operation, the limited thread section A operates to eliminate crushing of the plate and insulating material by using higher pitch threads than are present in thread section B.

From the foregoing, it will be apparent that the present invention contemplates a very practical screw type fastener which may be used effectively in insulating material. In particular, the fastener described above is extremely beneficial when the application of a fastener to a panel including insulating material would produce long free falling, unstabilized drop-through of the threaded fastener, which quite possibly could result in damage to the drilling point. Also, the screw fastener described herein may be produced by practicing conventional screw manufacturing processes, as for example, thread rolling and the like. The wings or lugs 18 may be formed by pinching oppositely disposed circumferentially peripheral portions of the unthreaded shank portion and this may also be accomplished by conventional methods of metal working.

While for purposes of illustrating the applicant's invention certain embodiments have been disclosed and described herein, it should be understood that the invention contemplates other modifications and changes without departing from the spirit and scope of the appended claim.

I claim:

1. A screw-type fastener adapted to fasten a thin sheet of material to a thicker sheet spaced by a predetermined thickness of insulating material, said fastener including a shank having a work clamping head integrally formed on one extremity of the shank, a drilling tip formed on the opposite extremity of the shank, a first section of thread convolutions adjacent the work clamping head and extending for a limited axial extent along the shank, a second section of thread convolutions extending for a limited axial extent adjacent the drilling tip and axially spaced from the first section of thread convolutions, a third section of threads formed on the shank intermediate the first and second thread sections for stabilizing and controlling the drop of the fastener through the insulating material, the outer diameter of the third section of threads being greater than the outer diameter of the second section of threads and less than the outer diameter of the first section, rigid abutment means located on the shank intermediate the third section of threads and the second thread section, said rigid abutment means extending radially a distance greater than the root diameter of the convolutions of the second thread section, unthreaded means between the first and third thread sections to insure that the drilling of the thicker sheet is not impeded by restriction to axial movement of the fastener, whereby, the third section of threads controls and stabilizes the drop-through of the fastener in the insulation material prior to the engagement of drilling tip with the thicker sheet of material while allowing free drilling operation thereof.

2. A screw-type fastener as set forth in claim 1, wherein the first section of thread convolutions has a pitch and outer diameter greater than the pitch and outer diameter of the second section of threads.

3. In combination with a panel structure consisting of an inner section of insulating material of substantial thickness bounded on one side by a first relatively thin sheet of material and on the opposite side by a second sheet of thicker material, a screw-type fastener having a shank completely traversing said panel structure, a head at one extremity of the shank clampingly urged against the relatively thin first sheet of material, a first section of thread convolutions of relatively high pitch extending for a limited axial extent along the shank from the vicinity of the clamping side of the head, a drilling tip at the other extremity of the shank, a second section of thread convolutions having a pitch less than the first section adjacent the drilling tip and extending for a limited axial extent toward the first threaded section, a third section of thread convolution means for controlling the rate of entry of the fastener into the panel located between the first and second section and separated from said first and second sections by unthreaded portions of the shank the unthreaded portion extending between the second and third threaded portion including winged abutment means having a diameter greater than the outer diameter of the second threaded section and less than the outer diameter of the third threaded section, the unthreaded shank portion extending between the first threaded portion and the third threaded portion, being of an axial extent not less than the length of the drilling tip to insure unrestricted application of drilling force to be applied to the thick second sheet of material, the outer diameter of the first threaded section being greater than the second and third threaded sections as well as being greater than the abutment wings and unthreaded portions, the axial extent of the shank from the lower extremity of the drilling tip to the upper extremity of the third threaded section being substantially equal to the thickness of the insulating material, whereby a fastener is forced through the panel at a controlled rate due to the interaction of the third threaded section with thin sheets of material while the unthreaded shank portion between the first threaded section and third threaded section allows the drilling tip to proceed through the second sheet of material without limiting axial movement thereof.

* * * * *